(12) United States Patent
Uchi et al.

(10) Patent No.: US 6,483,520 B1
(45) Date of Patent: Nov. 19, 2002

(54) IMAGE CREATING METHOD AND APPARATUS, RECORDING MEDIUM FOR RECORDING IMAGE CREATING PROGRAM, AND VIDEO GAME MACHINE

(75) Inventors: Takeshi Uchi, Kobe (JP); Hidekazu Shimizu, Kobe (JP)

(73) Assignee: Konami Co., Ltd., Tokyo-to (JP)

(*) Notice: Subject to any disclaimer, the term of this patent is extended or adjusted under 35 U.S.C. 154(b) by 0 days.

(21) Appl. No.: 09/523,819

(22) Filed: Mar. 13, 2000

(30) Foreign Application Priority Data

Mar. 16, 1999 (JP) .............................. 11-070534

(51) Int. Cl.⁷ ................................ G09G 5/02
(52) U.S. Cl. .................. 345/619; 345/441; 345/473; 345/474; 345/475; 384/100; 463/33
(58) Field of Search .................. 345/419, 473, 345/474, 475, 582, 619, 441, 442, 672; 703/9; 384/100

(56) References Cited

U.S. PATENT DOCUMENTS 5,712,689 A * 1/1998 Yasuki et al.
5,830,066 A * 11/1998 Goden et al.
5,877,777 A    3/1999 Colwell
6,121,977 A * 9/2000 Arai et al.

FOREIGN PATENT DOCUMENTS

EP          0782104         7/1997

* cited by examiner

Primary Examiner—Mark Zimmerman
Assistant Examiner—Kimbinh T. Nguyen
(74) Attorney, Agent, or Firm—Jordan and Hamburg LLP

(57) ABSTRACT

In an image creating apparatus, a liquid-object model is realistically represented by using a simple liquid-object model consisting of a plurality of polygons. A ROM stores wave-swell polygon data and texture data representing the swell of waves. The swell of a wave is formed of N liquid-object polygon sets. Each of the polygon sets consists of a plurality of hexagonal polygons. The lateral surfaces, i.e., the longitudinal dimensions, of the polygons are arranged orthogonal to the Z axis. The polygon sets are sequentially arranged in the Z-axis direction.

35 Claims, 14 Drawing Sheets

FIG. 12A
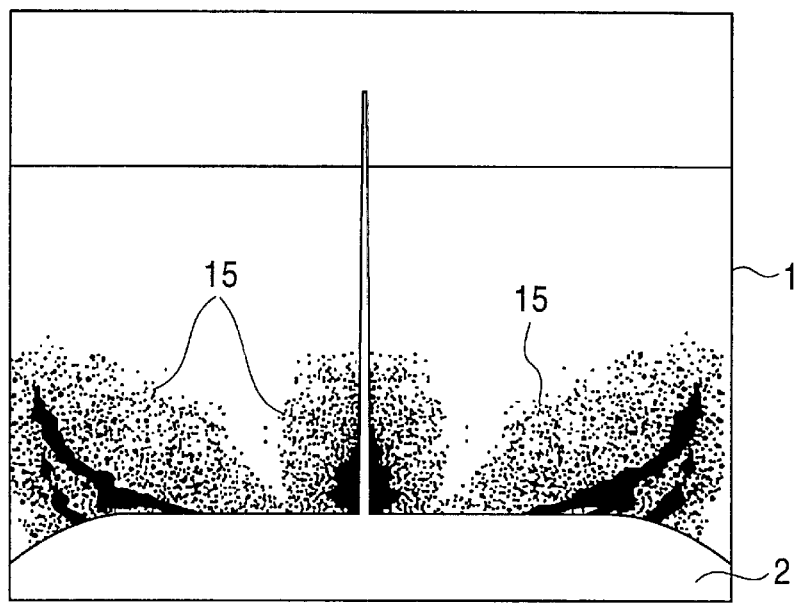
FIG. 12B
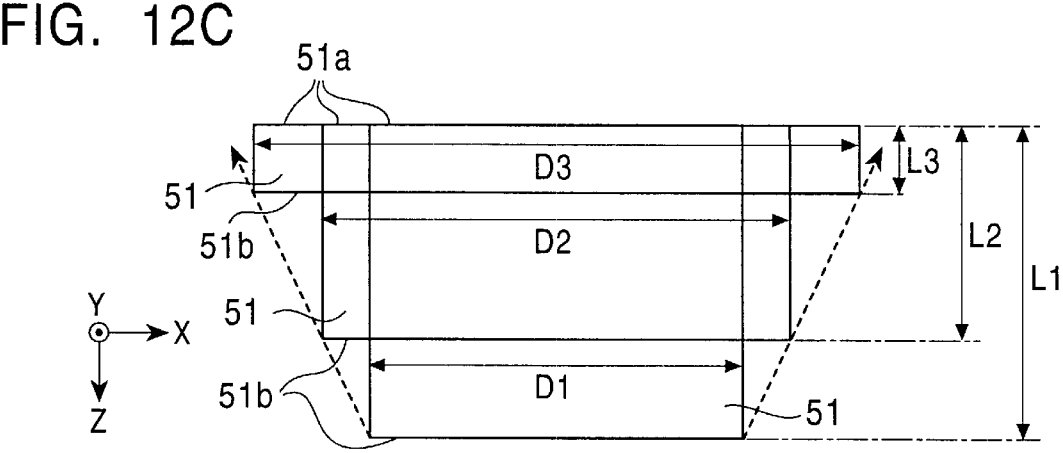
FIG. 12C
FIG. 12D
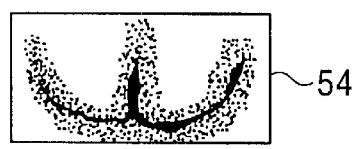

IMAGE CREATING METHOD AND APPARATUS, RECORDING MEDIUM FOR RECORDING IMAGE CREATING PROGRAM, AND VIDEO GAME MACHINE

BACKGROUND OF THE INVENTION

1. Field of the Invention

The present invention relates to an image creating method and apparatus for creating an image of a liquid-object model which virtually represents a liquid object set in a three-dimensional virtual space. The invention also relates to a recording medium for recording a program implementing the above-described image creating method and to a video game machine.

2. Description of the Related Art

Conventionally, many game systems have been proposed: for example, a system consisting of a home-use game machine and a television monitor; and a system consisting of a commercial-use game machine, such as a personal computer or a workstation, a display unit, and a sound output unit.

Both types of systems are formed of a controller operated by a player, a recording medium on which a game program is recorded, a central processing unit (CPU) for controlling the generation of sound and images based on a game program, a processor for generating images, a processor for issuing sound, a monitor for displaying images, and a speaker for outputting sound. The above-described recording medium may include a CD-ROM, a semiconductor memory, or a cassette having a built-in semiconductor memory.

In the above types of game systems, a video game in which a liquid-object model virtually representing a liquid object, such as a sea or a river, is displayed on a monitor, for example, a fishing video game, may be considered. In this case, a liquid-object model is three-dimensionally formed by using polygons, and a texture representing, for example, a sea, is mapped on the individual polygons, thereby displaying the resulting model on a monitor.

In displaying such a model, there is a demand for realistically representing a virtual liquid object, such as the swell of waves and the flow of water, by suitably forming a liquid-object model by using polygons.

SUMMARY OF THE INVENTION

Accordingly, in view of the above background, it is an object of the present invention to provide an image creating method and apparatus for realistically representing a virtual liquid object by using a simple liquid-object model consisting of a plurality of polygons, and also to provide a recording medium for recording a program implementing the above image creating method and a video game machine.

In order to achieve the above object, according to one aspect of the present invention, there is provided an image creating apparatus for rendering a liquid-object model which virtually represents a liquid object set in a three-dimensional virtual space. The image creating apparatus includes a display unit. A first polygon storage unit stores at least one polygonal-prism liquid-object polygon set which consists of a plurality of polygons and which forms the liquid-object model, a lateral surface of the polygon set being arranged in a direction intersecting a line from a predetermined viewpoint. A first texture storage unit stores a liquid-object texture to be mapped on the polygons of the liquid-object polygon set. A first polygon-coordinate processing unit tilts a longitudinal dimension of the liquid-object polygon set in a predetermined direction with a predetermined amplitude with respect to a set position. A rendering processing unit displays the liquid-object model on the display unit by mapping the liquid-object texture on the polygons of the liquid-object polygon set.

With this arrangement, a liquid-object model is suitably displayed by a simply constructed liquid-object polygon set.

The aforementioned first polygon storage unit may store a plurality of the liquid-object polygon sets which are sequentially arranged along the line from the viewpoint.

Accordingly, since a plurality of the liquid-object polygon sets are displayed along the line from the viewpoint, the depth of the virtually displayed liquid-object is added, and the virtual liquid-object is more realistically displayed.

The first polygon-coordinate processing unit may rotate the liquid-object polygon set around an axis intersecting the line from the viewpoint with respect to the set position.

With this arrangement, the liquid-object texture is rotated on the display unit. Thus, it appears to the viewer that the liquid-object texture is rotated, thereby more realistically displaying the virtual liquid-object.

The above-described image creating apparatus may include: a second polygon storage unit for storing at least a spray polygon which forms a spray model virtually representing spray of the liquid object; a second texture storage unit for storing a spray texture representing the spray model; and a second polygon-coordinate processing unit for enlarging and reducing dimensions of the spray polygon over time within a predetermined range. The rendering processing unit may display the spray model on the display unit by mapping the spray texture on the spray polygon.

With this configuration, it is possible to suitably display the spray of the liquid object.

The aforementioned image creating apparatus may further include: a third polygon storage unit for storing at least one quadrilateral wake polygon which forms a wake model virtually representing wake of the liquid object and which has a pair of first sides intersecting the line from the viewpoint and a pair of second sides orthogonal to the first sides; a third texture storage unit for storing a wake texture representing the wake model; and a third polygon-coordinate processing unit for enlarging dimensions of the first sides and also reducing dimensions of the second sides with a lapse of time while fixing positions of the second sides. The rendering processing unit may display the wake model on the display unit by mapping the wake texture on the wake polygon.

With this configuration, the wake of the liquid-object can be suitably displayed on the display unit.

The above-described liquid-object model may virtually represent a sea wave, in which case, a virtual wave can be realistically displayed on the display unit.

According to another aspect of the present invention, there is provided an image creating method for rendering a liquid-object model which virtually represents a liquid object set in a three-dimensional virtual space. The image creating method includes the steps of: storing at least one polygonal-prism liquid-object polygon set which consists of a plurality of polygons and which forms the liquid-object model, a lateral surface of the polygon set being arranged in a direction intersecting a line from a predetermined viewpoint; storing a liquid-object texture to be mapped on the polygons of the liquid-object polygon set; tilting a longitudinal dimension of the liquid-object polygon set in a predetermined direction with a predetermined amplitude with respect to a set position; and displaying the liquid-object model on a display unit by mapping the liquid-object texture on the polygons of the liquid-object polygon set.

With this arrangement, it is possible to realistically display the virtual liquid object by a simply constructed liquid-object polygon set on the display unit.

According to still another aspect of the present invention, there is provided a recording medium for recording an image creating program used for rendering a liquid-object model virtually representing a liquid object set in a three-dimensional virtual space. The image creating program includes: a providing step of providing at least one polygonal-prism liquid-object polygon set which consists of a plurality of polygons and which forms the liquid-object model, a lateral surface of the polygon set being arranged in a direction intersecting a line from a predetermined viewpoint; a providing step of providing a liquid texture to be mapped on the polygons of the liquid-object polygon set; a tilting step of tilting a longitudinal dimension of the liquid-object polygon set in a predetermined direction with a predetermined amplitude with respect to a set position; and a mapping step of mapping the liquid texture on the polygons of the liquid-object polygon set.

By reading the recording medium by a computer and executing the above-described program, the foregoing steps are implemented. This enables the virtual liquid object to be realistically displayed on the display unit by using the simply constructed liquid-object polygon set.

According to a further aspect of the present invention, there is provided a video game machine including an image creating unit, which is formed by the above-described image creating apparatus, for rendering a liquid-object model which virtually represents a liquid object set in a three-dimensional virtual space. An externally operable operation unit outputs an operation signal according to an operation state. A viewpoint-line changing unit changes a viewpoint-line direction according to the operation signal.

With this configuration, the liquid-object model can be suitably displayed on the display unit according to the viewpoint-line direction.

BRIEF DESCRIPTION OF THE DRAWINGS

FIG. 11A illustrates the screen of the monitor showing the spray of the waves; FIG. 11B is a side view illustrating polygons which form the spray; FIG. 11C is a plan view illustrating the polygons; and FIG. 11D illustrates texture representing the spray;

FIGS. 12A through 12D illustrate a wake: FIG. 12A illustrates the screen of the monitor showing the wake; FIG. 12B is a side view illustrating polygons which form the wake, as viewed from the X-axis direction; FIG. 12C is a plan view illustrating a change of the configuration of the polygons over time; and FIG. 12D illustrates texture representing the wake.

DESCRIPTION OF THE PREFERRED EMBODIMENTS

Figure 2:
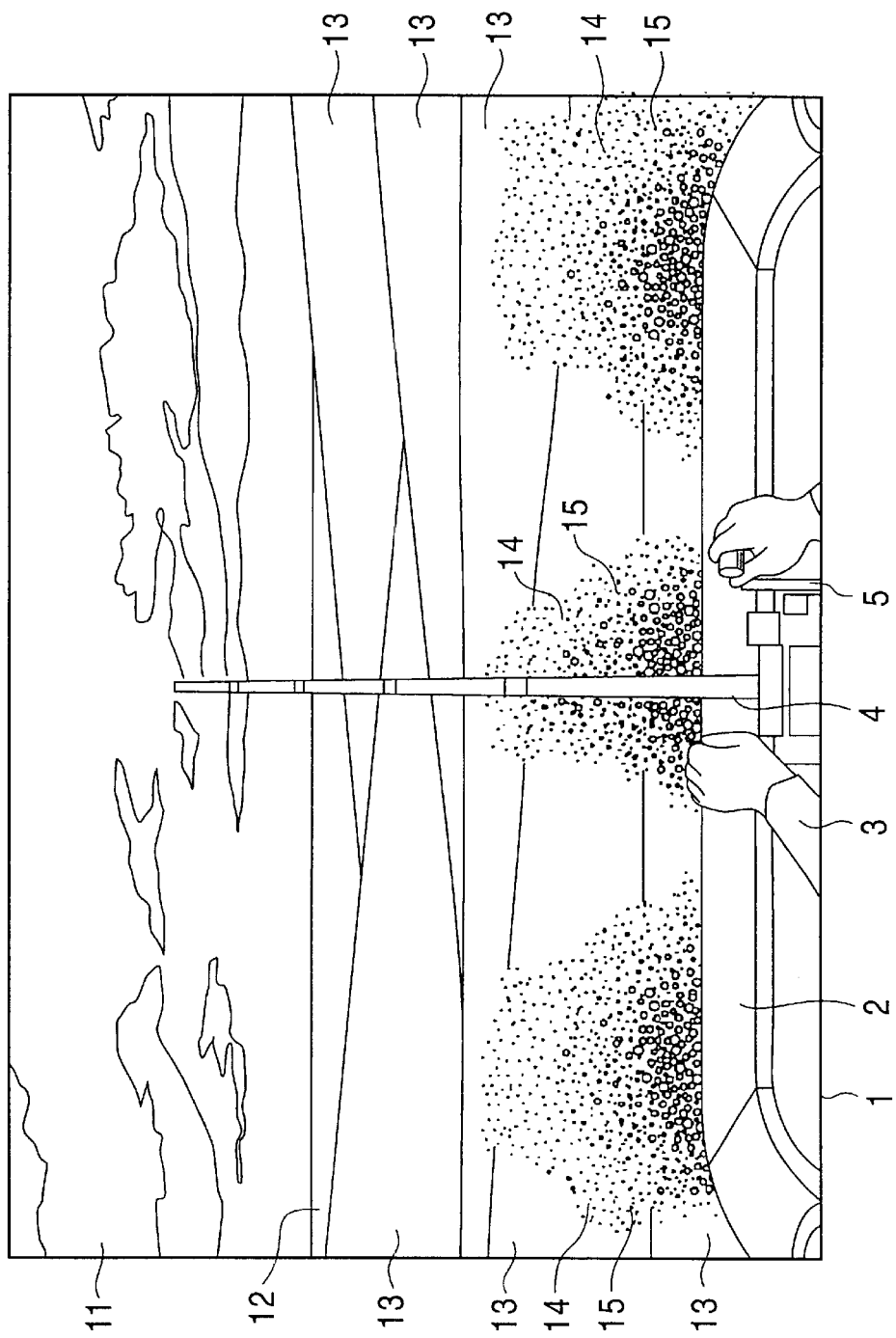
FIG. 2 illustrates one screen of a game displayed on a monitor.

A brief description is given below of a video game for use in a video game machine according to an embodiment of the present invention with reference to FIG. 2 illustrating one screen of the game displayed on a monitor.

Figure 1:
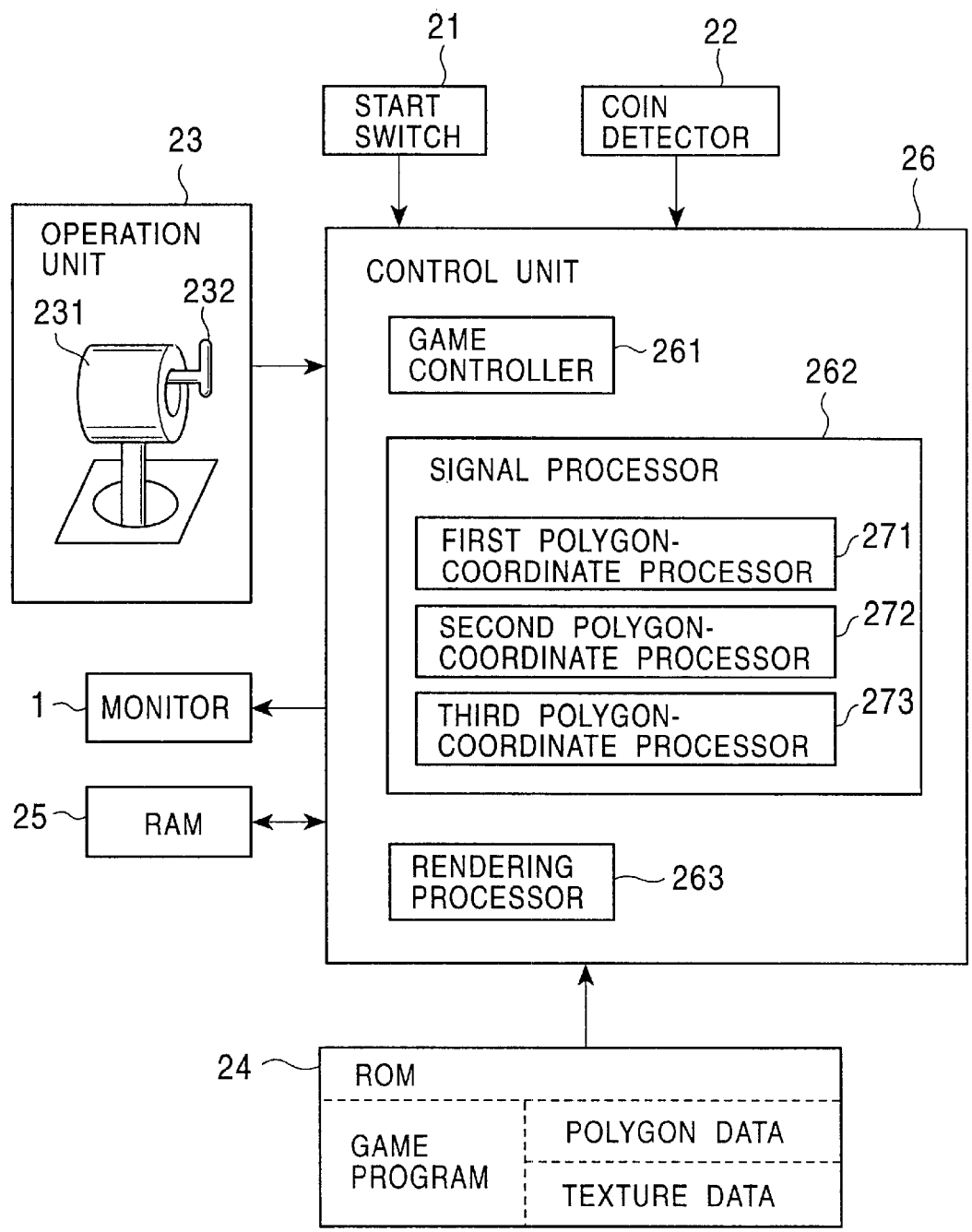
FIG. 1 is a block diagram illustrating the electrical configuration of a video game machine according to an embodiment of the present invention and functional blocks of a control unit for use in the video game machine.

The video game shown in FIG. 2 is a fishing game in which a fishing spot at sea is displayed on a monitor 1, and fishing is conducted by allowing a character 3 on a fishing boat 2 to operate a fishing rod 4 or a reel-winding portion 5 according to a player's operation on an operation unit 23 (see FIG. 1).

In FIG. 2, a sky 11 is displayed at the upper portion of the monitor 1, below which a sea 12 including a horizon is displayed. The swell of a plurality of waves (liquid-object models) 13 is displayed farther down, and spray (liquid-object models) 14 of waves (liquid-object models) and a wake 15 (liquid-object model) are displayed immediately above the fishing boat 2 while being overlapped with the swell of the waves 13. The wake 15 is generated by, for example, the movement of the fishing boat 2.

FIG. 1 is a block diagram illustrating the electrical configuration of the video game machine of this embodiment and functions of a control unit of this game machine. The video game machine is formed of, as shown in FIG. 1, the above-described monitor 1 (FIG. 2), a start switch 21, a coin detector 22, the above-described operation unit 23, a read only memory (ROM) 24, a random access memory (RAM) 25, and a control unit 26. The control unit 26 has functional blocks, such as a game controller 261, a signal processor 262, and a rendering processor 263.

Upon a player pressing the start switch 21, a switching signal is transmitted to the control unit 26. The coin detector 22 detects a coin dropped in a coin slot (not shown), and a detection signal is transmitted to the control unit 26.

The operation unit 23 is externally operable by a player, and an operation signal obtained according to the operation is output to the control unit 26. As schematically illustrated in FIG. 1, the operation unit 23 is formed of a handle 231 which is tiltable in the forward and backward directions and in the left and right directions, and a rotational operator 232 which is rotatably attached to the handle 231 and which simulates an actual reel. Operation data, such as the tilting direction of the handle 231 or the rotational direction and velocity of the rotational operator 232, is converted into a corresponding level of voltage and is output to the control unit 26.

The ROM 24 stores wave-swell polygon data, wave-spray polygon data, and wake polygon data together with the game program of the video game of this embodiment (that is, the ROM 24 serves as a first polygon storage unit, a second polygon storage unit, and a third polygon storage unit). The ROM 24 also stores wave-swell texture data, wave-spray texture data, and wake texture data together with the game program of the video game of this embodiment (that is, the ROM 24 serves as a first texture storage unit, a second texture storage unit, and a third texture storage unit). The polygon data and the texture data will be discussed in detail below. The RAM 25 is used for temporarily storing data, and, for example, image data to be displayed on the monitor 1 is written into the RAM 25.

The control unit 26, which is formed of a single or a plurality of CPUs and electronic circuits, performs various calculations at a predetermined sampling period, and displays an image on the monitor 1 according to the calculation results.

The game controller 261 of the control unit 26 generates a task command for an operation, such as rendering, based on the game program stored in the ROM 24 and the operation signal sent from the operation unit 23, and proceeds the game. The game controller 261 has the functions of: (1) determining whether a coin has been dropped into the coin slot (not shown) according to the presence or the absence of a detection signal transmitted from the coin detector 22; (2) determining whether the start switch 21 has been pressed by a player according to the presence or the absence of a switching signal sent from the start switch 21; and (3) changing the line of the viewpoint to the leftward direction when the handle 231 is tilted in the leftward direction and changing the line of the viewpoint to the rightward direction when the handle 231 is tilted in the rightward direction.

The signal processor 262 performs, based on a command from the game controller 261, calculations for positions of characters and models in a three-dimensional virtual space, calculations for perspective-projection transform from a position in a three-dimensional virtual space to a monitor plane, calculations for a light source, etc. In displaying, for example, the swell of a wave, the signal processor 262 performs calculations so that a polygon set, which forms the swell of a wave, is tilted in a Y-axis direction and is rotated around an X axis. This will be discussed in detail below.

The signal processor 262 includes functional blocks, such as a first polygon-coordinate processor 271, a second polygon-coordinate processor 272, and a third polygon-coordinate processor 273. The operations of the first through third polygon-coordinate processors 271 through 273 are described below.

The rendering processor 263 writes image data to be rendered into the RAM 25, for example, the rendering processor 263 writes texture data into an area of the RAM 25 specified by a polygon, based on calculation results of the signal processor 262.

The rendering functions of the game controller 261, the signal processor 262, and the rendering processor 263 are as follows.

Polygon data that defines models and characters, and texture data corresponding to the polygon data are stored in the RAM 25. Polygons are objects which are set in a game space, i.e., two-dimensional polygonal virtual figures forming a model or a character. In this embodiment, triangle or quadrilateral figures are used. Texture data is two-dimensional image data to be mapped on the polygons so as to form an image.

The rendering commands issued by the game controller 261 include a command for rendering a three-dimensional image by using polygons. Such a rendering command is formed of polygon-vertex address data indicating the address of polygon vertices on the display area of the RAM 25, texture address data designating the storage location in the RAM 25 of texture data to be mapped on the polygons, and luminance data representing the luminance of the texture.

Among the above-described items of data, the polygon-vertex address data on the display area can be obtained in the following manner. The signal processor 262 performs coordinate transform and perspective-projection transform, based on the amounts by which polygons are translated and rotated on the screen (viewpoint), on polygon-vertex coordinate data in a three-dimensional space output from the game controller 261, thereby transforming it into polygon-vertex coordinate data in a two-dimensional space.

The above-mentioned polygon-vertex address data designates the address of polygon vertices on the display area of the RAM 25, and the rendering processor 263 writes texture data, which is represented by the pre-assigned texture address data, into the display area of the RAM 25 indicated by the three- or four-sided polygon-vertex address data.

As a result, an object (model) obtained by mapping texture data on a plurality of polygons is displayed on the screen of the monitor 1.

Figure 8:
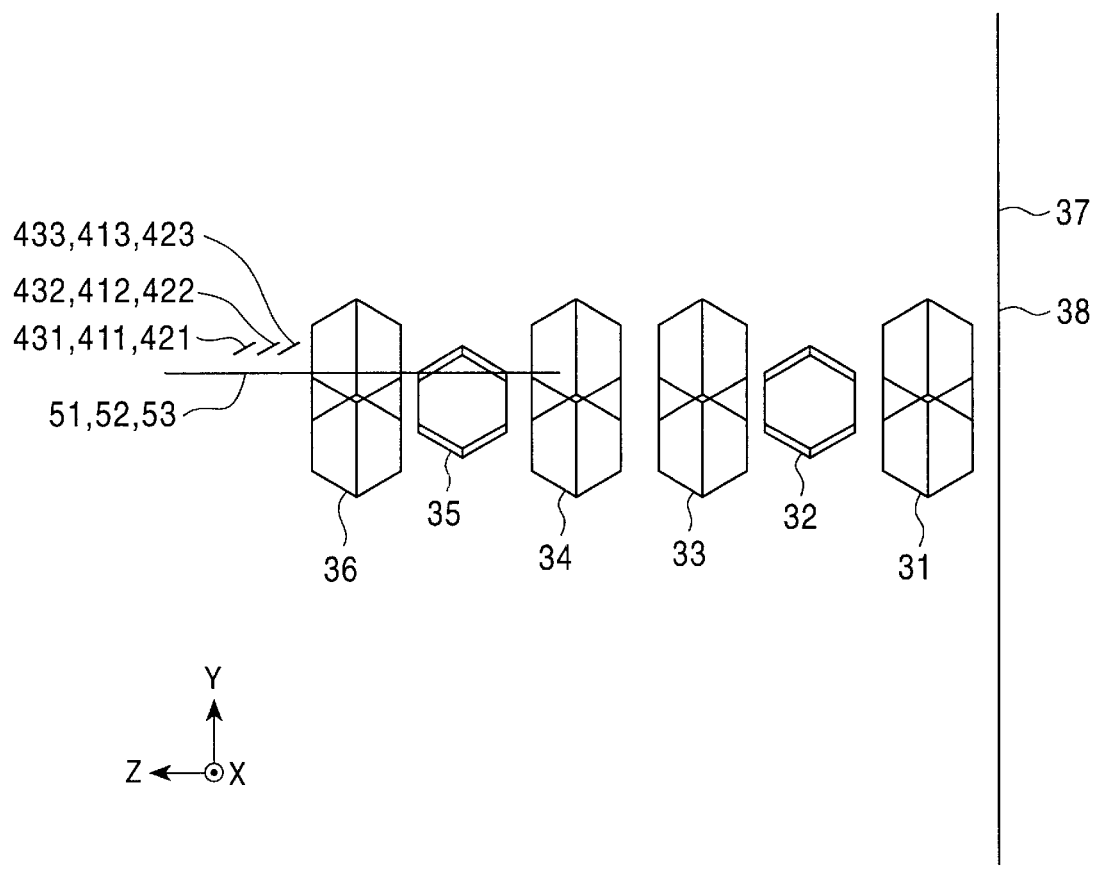
FIG. 8 is a side view illustrating the polygon sets, as viewed from the X-axis direction shown in FIG. 6.
Figure 9:
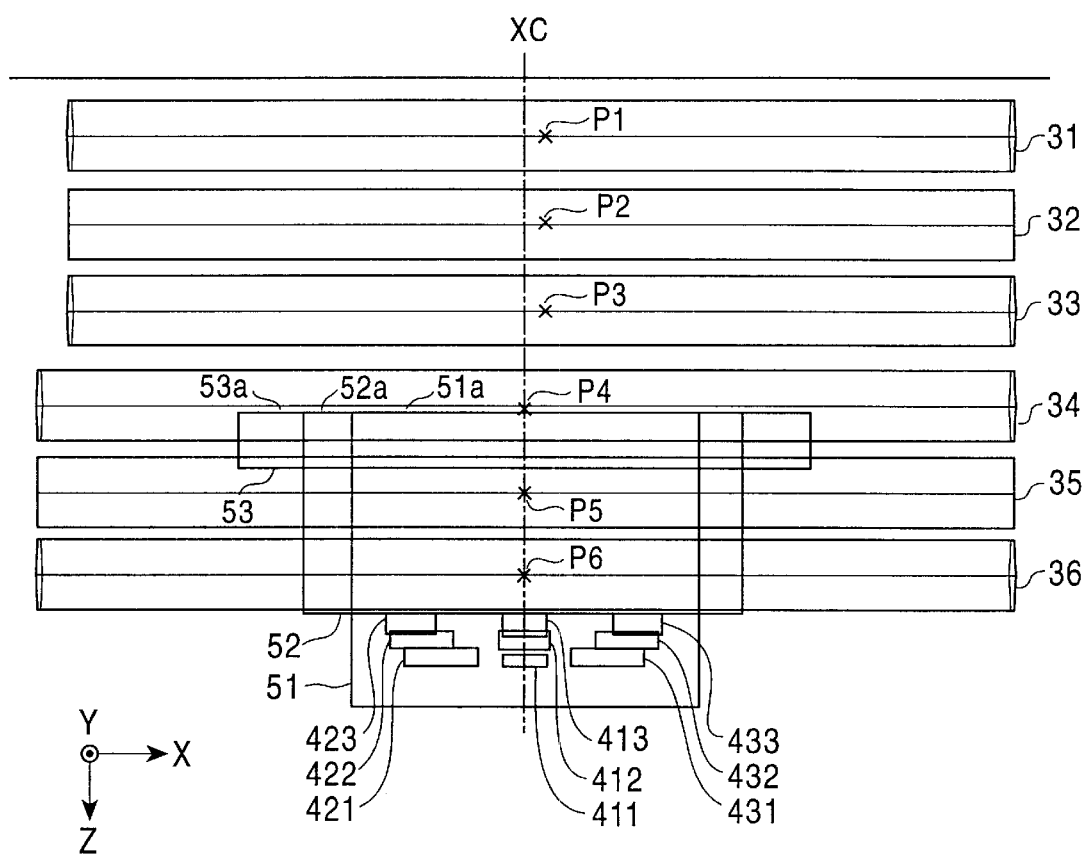
FIG. 9 is a plan view illustrating the polygon sets, as viewed from the Y-axis direction shown in FIG. 6.
Figure 10:
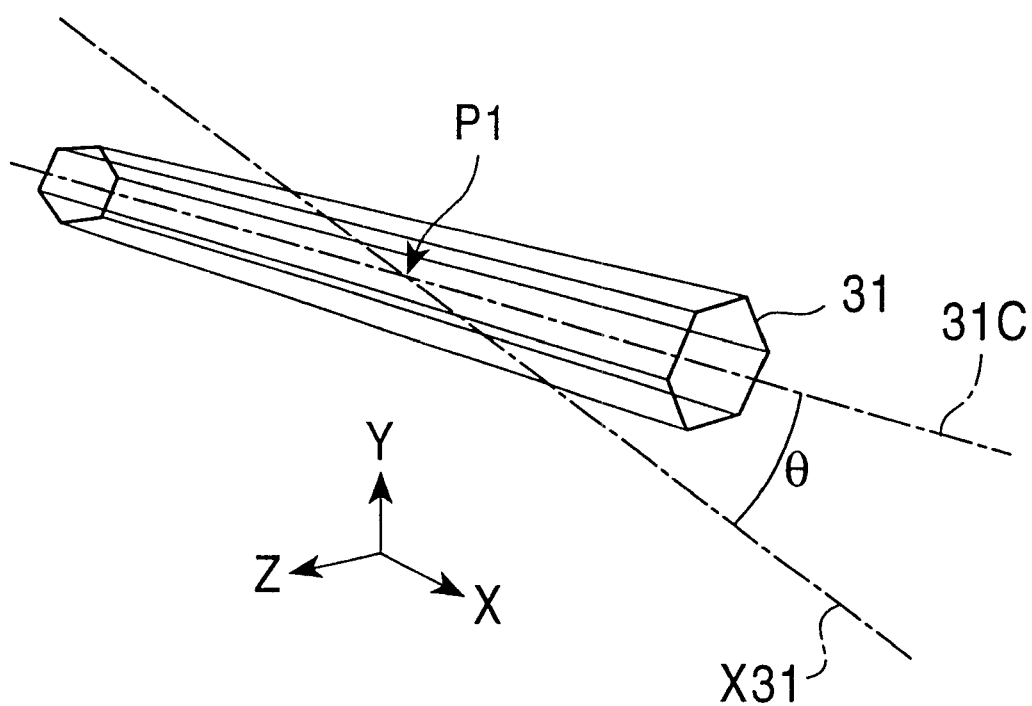
FIG. 10 illustrates the movement of the polygon sets.

A technique of displaying the swell of waves is discussed below with reference to FIGS. 2 through 10. FIGS. 3 through 7 are wire frame diagrams illustrating polygon sets which are translated over time. FIG. 8 is a side view illustrating the polygon sets as viewed from the X axis shown in FIG. 6. FIG. 9 is a plan view illustrating the polygon sets as viewed from the Y axis shown in FIG. 6. FIG. 10 illustrates the translation of the polygon sets.

Figure 3:
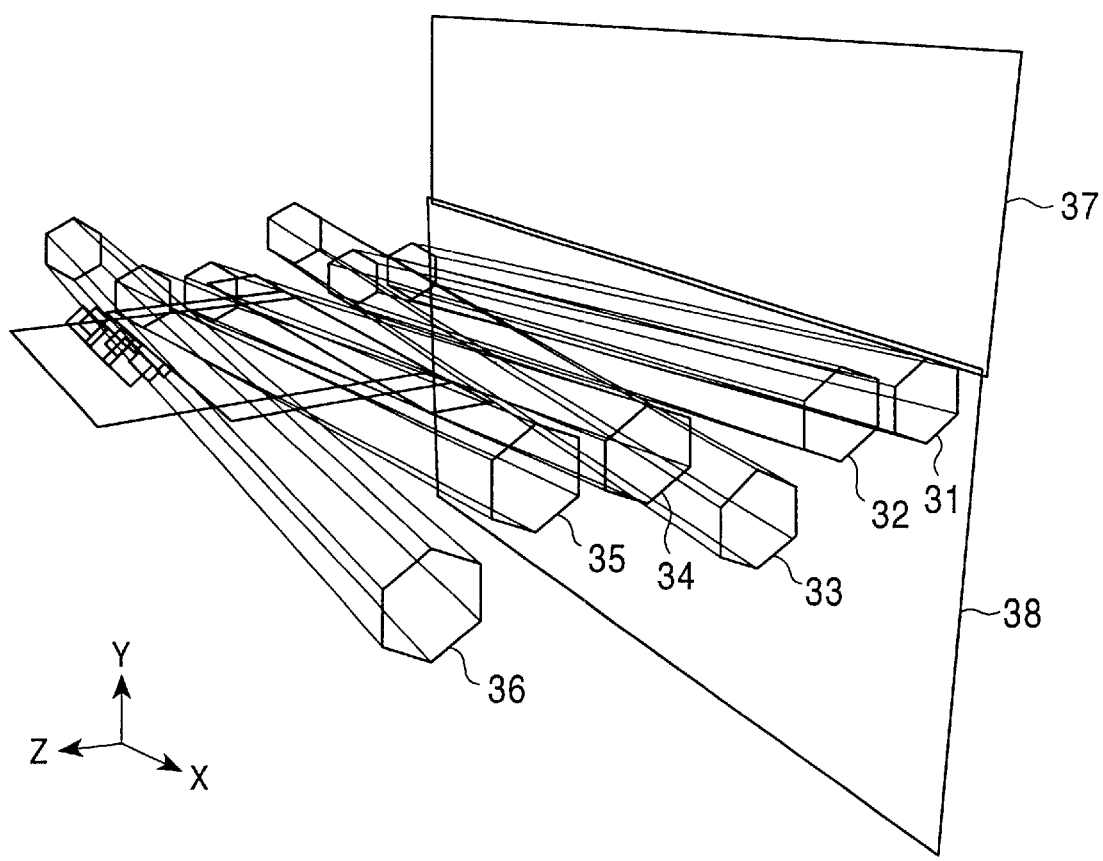
FIGS. 3 through 7 are wire frame diagrams illustrating polygon sets which are shifted over time.
Figure 4:
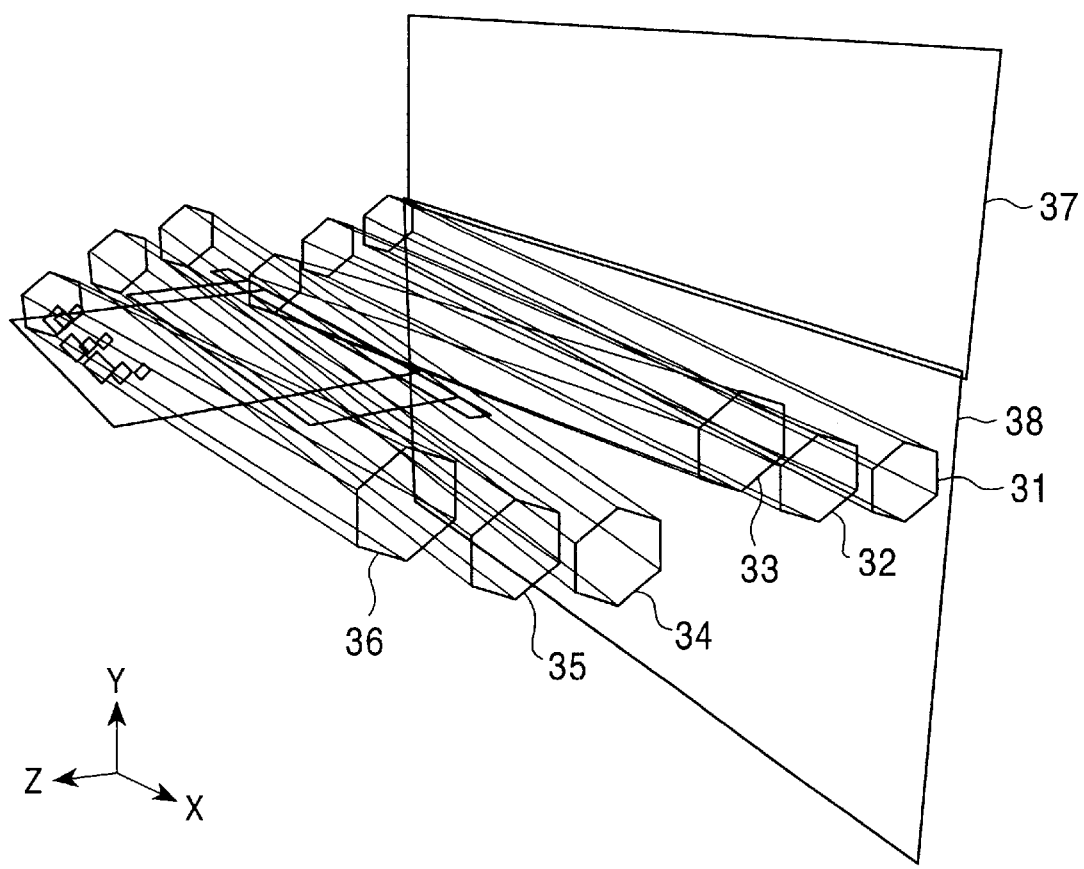
Figure 5:
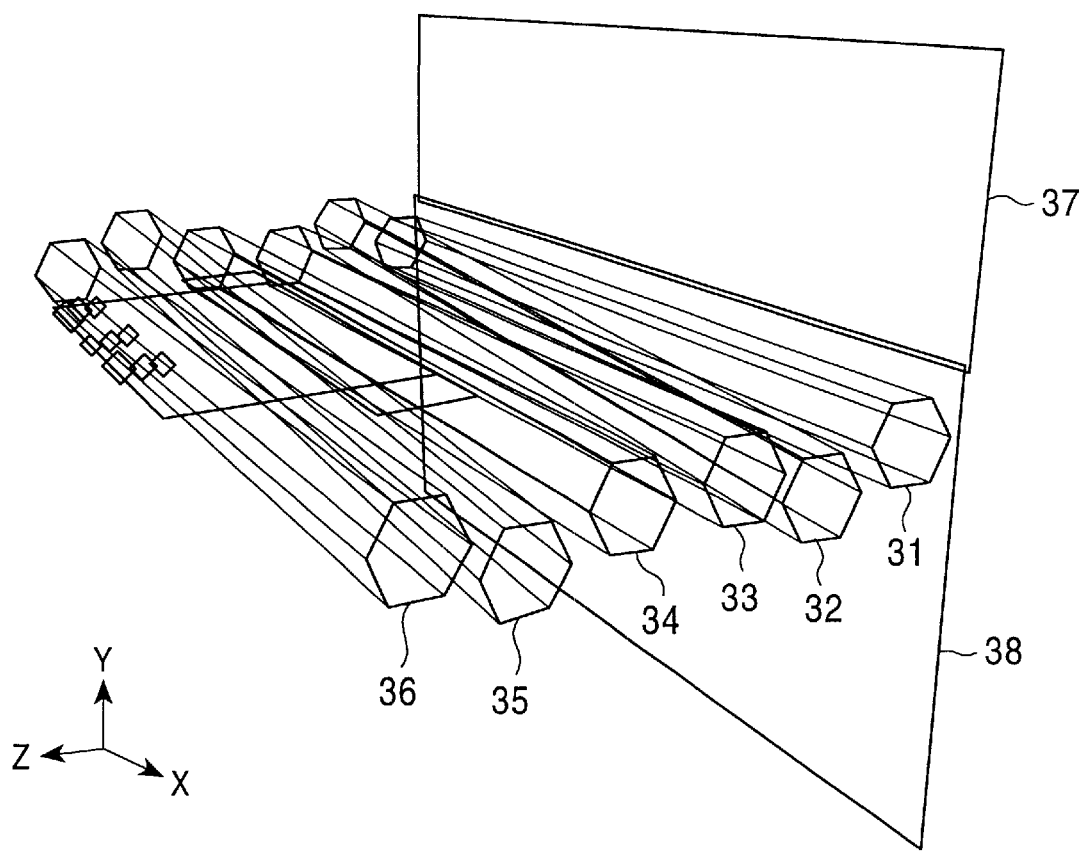
Figure 6:
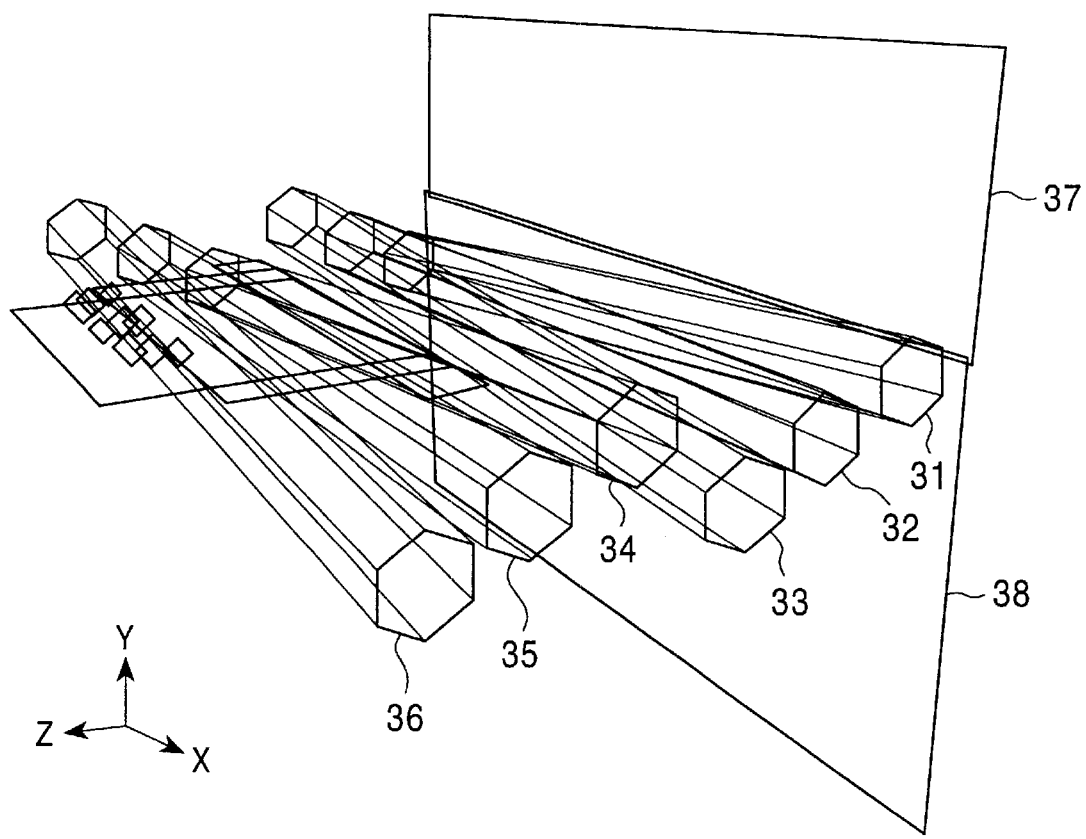
Figure 7:
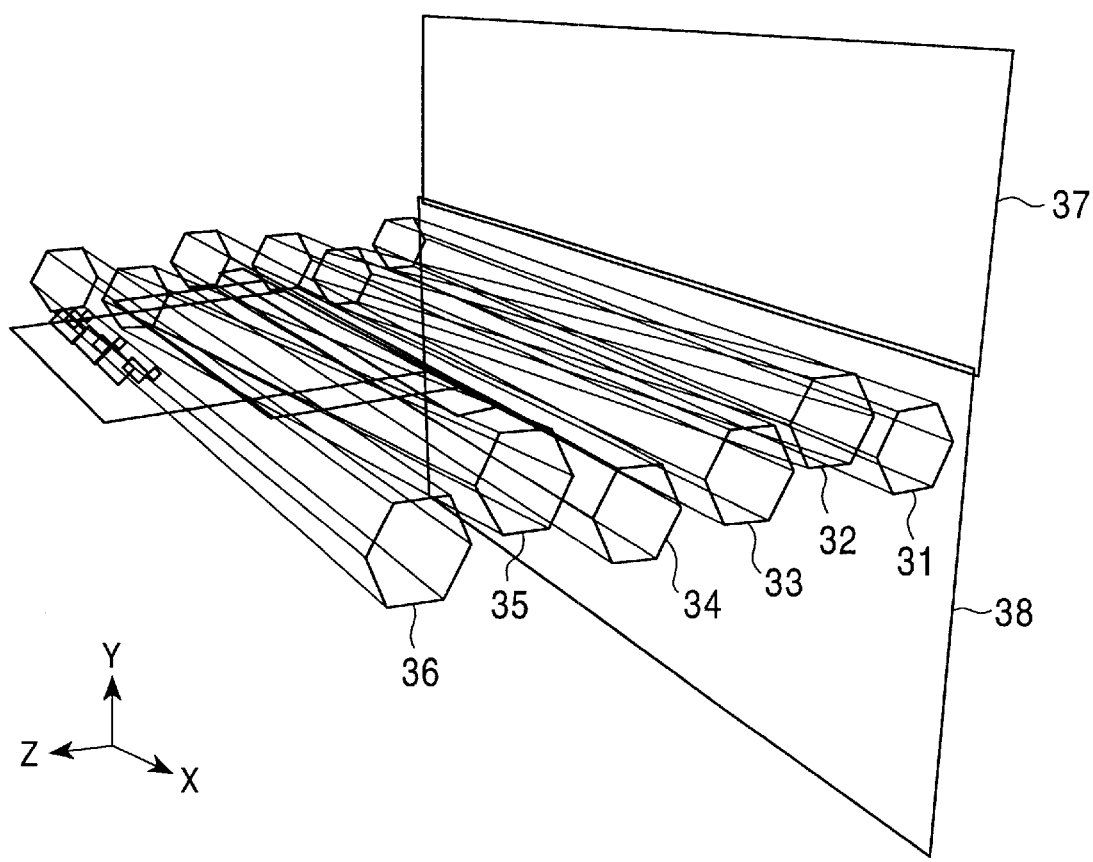

A three-dimensional world coordinate system (X, Y, Z) shown in FIG. 3 is a coordinate system set in a three-dimensional virtual space, and polygons forming a model or a character are described by using the world coordinate system (X, Y, Z). In this embodiment, the Z axis is a direction orthogonal to the screen of the monitor 1, i.e., the direction from the viewpoint, the X axis is set in the horizontal (H) direction of the screen of the monitor 1, and the Y axis is set in the vertical (V) direction of the screen of the monitor 1.

The swell of a wave 13 (FIG. 2) is formed of, as shown in FIG. 3, N number (N is an integer, and N is six in this embodiment) of liquid-object polygon sets (hereinafter referred to as "rolls") 31 through 36. The rolls 31 through 36 are in the form of prisms (in this embodiment, hexagonal prisms) and are each formed of a plurality of polygons. The lateral surfaces, i.e., the longitudinal surfaces, of the rolls 31 through 36 are set orthogonal to the Z axis (orthogonal in the direction from the viewpoint), as shown in FIG. 9, and the rolls 31 through 36 are sequentially arranged in the Z-axis direction. The lateral surfaces of the rolls 31 through 36 may be arranged to intersect with the Z axis rather than being orthogonal to the Z axis.

In FIG. 9, the center line XC indicates the center of the X-axis direction in a three-dimensional virtual space, and centers P1 through P3 of the rolls 31 through 33, respectively, are displaced from the center line XC slightly in the rightward direction, while centers P4 through P6 of the rolls 34 through 36, respectively, are located on the center line XC.

The rolls 31 through 36 are translated by the first polygon-coordinate processor 271. For example, concerning the roll 31, as shown in FIG. 10, with respect to the center P1 (set position), a center axis 31C is tilted from an axis X31, which passes through the center P1 and is parallel to the X axis, in the Y-axis direction at a predetermined angle θ (predetermined direction), and the roll 31 is also rotated around the axis X31 at a predetermined angular velocity ω. This causes the roll 31 to rotate around the axis X31 with an amplitude θ and at a rotational velocity ω with respect to the center P1.

The rolls 32, 33, 34, 35, and 36 are rotated at the same amplitude as that of the roll 31 around the centers P2, P3, P4, P5, and P6, respectively, while being respectively delayed from the rolls 31, 32, 33, 34, and 35 by a predetermined phase. Accordingly, the rolls 31 through 36 are rotated, as shown in FIGS. 3 through 7, while being progressively delayed by a predetermined phase.

Then, the wave-swell texture stored in the ROM 24 is mapped on the individual polygons of the rolls 31 through 36 by the rendering processor 263, thereby suitably displaying the swell of waves 13, as shown in FIG. 2.

In this video game, a plurality of fishing spots are set, and the weather is preset for each fishing spot. The amplitude θ is determined by the weather. For example, a greater value θ is set for stormy weather, and a smaller value θ is set for fine weather. That is, the first polygon-coordinate processor 271 has the function of setting the amplitude according to the weather. By virtue of this function, the swell of waves 13 (FIG. 2) displayed on the monitor 1 can be increased or decreased, thereby enabling realistic representation of the swell of waves 13.

The rotational angular velocity ω is set according to a preset speed of the fishing boat 2 (FIG. 2). Accordingly, the movement of the fishing boat 2 can be suitably represented by the movement of the surface of the swell of waves 13 displayed on the monitor 1.

Additionally, as shown in FIG. 9, the centers P1 through P3 of the rolls 31 through 33 and the centers P4 through P6 of the rolls 34 through 36 are slightly displaced from each other in the X-axis direction, and thus, the random characteristics of the waves can be enhanced, thereby more realistically expressing the swell of waves 13.

In FIG. 3, polygons 37 and 38 are used for forming the sky 11 and the sea 12 including the horizon, respectively. Thus, the swell of waves 13 can be suitably displayed, as shown in FIG. 2, at the proximal side of the sky 11 and the sea 12.

The rolls 31 through 36 may be set so that the centers P1 through P6 of the rolls 31 through 36 are progressively displaced from each other in the X-axis direction. This further enhances the random characteristics of the waves so as to achieve more realistic representation of the swell of waves 13.

The fishing spot may be selected by operating the operation unit 23 before the start of the game, or may be specified in a preset order or randomly.

Figure 11A:
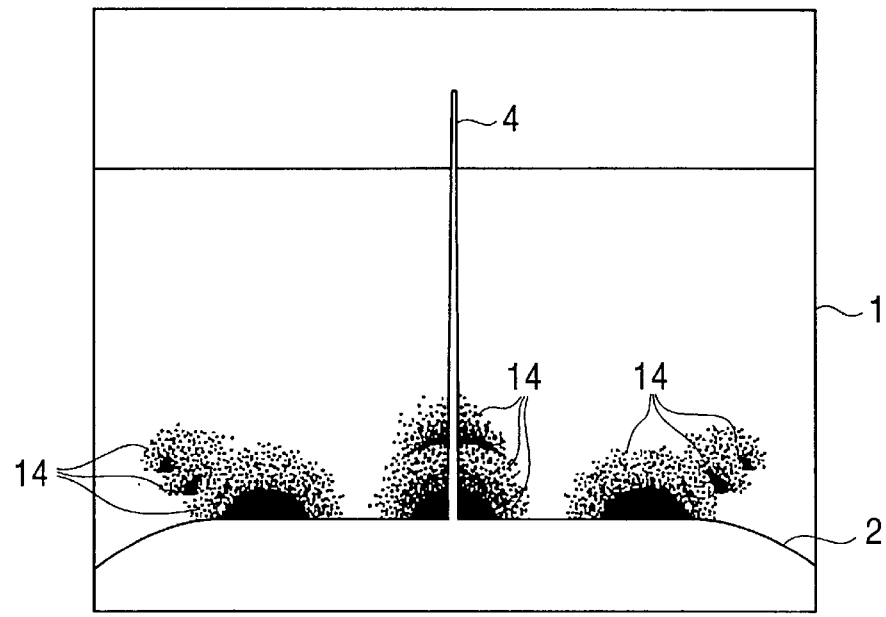
FIGS. 11A through 11D illustrate spray of waves.
Figure 11B:
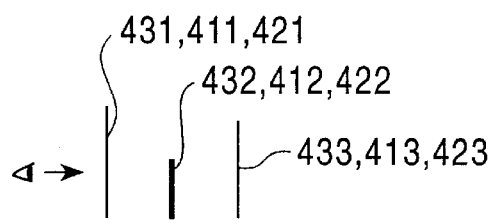
Figure 11C:
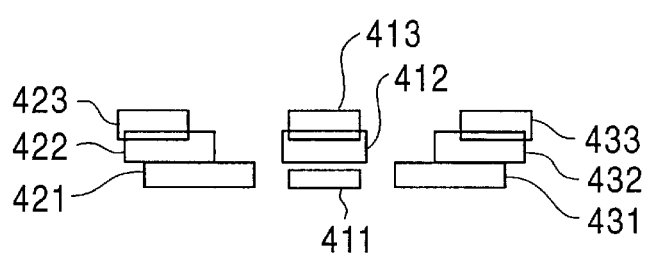
Figure 11D:
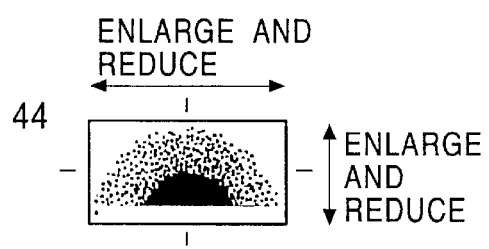

A technique of displaying the spray of waves is described below with reference to FIGS. 2 through 9 and 11A through 11D. FIGS. 11A through 11D illustrate the spray of the waves: FIG. 11A illustrates the screen of the monitor 1 showing the spray of the waves 14; FIG. 11B is a side view of polygons forming the spray of the waves 14; FIG. 11C is a plan view illustrating the polygons; and FIG. 11D illustrates a texture representing the spray of the waves.

Polygons forming the spray (hereinafter referred to as "spray polygons") are set, as shown in FIG. 9, in K columns (K is an integer, and K is three in this embodiment), and M polygons (M is an integer, and M is three in this embodiment) are set for each column. That is, spray polygons 411, 412, and 413 in a first column located on the center line XC in a three-dimensional virtual space, spray polygons 421, 422, and 423 in a second column placed at the left side of the center line XC, and spray polygons 431, 432, and 433 in a third column positioned at the right side of the center line XC are provided.

For example, as illustrated in FIGS. 9 and 11C, the second-column spray polygons 421, 422, and 423 and the third-column spray polygons 431, 432, and 433 are progressively displaced outward from each other in the upward direction (in the direction from the spray polygons 421 and 431 near the viewpoint to the spray polygons 423 and 433 away from the viewpoint).

The spray polygons 411 through 413, 421 through 423, and 431 through 433 are placed orthogonal to the line from the viewpoint, as shown in FIG. 11B. However, for example, as shown in FIG. 8, the viewpoint (not shown) may be set at a position higher than the X-Z plane, and the spray polygons 411 through 413, 421 through 423, and 431 through 433 may be slightly slanted with respect to the X-Z plane.

The spray polygons 411 through 413, 421 through 423, and 431 through 433 are translated by the second polygon-coordinate processor 272. More specifically, the second polygon-coordinate processor 272 counts the lapse of time, and enlarges and reduces each side, over time, with respect to the Z-axis center line of the individual spray polygons (for example, the center line XC for the spray polygons 411 through 413) and with respect to the X-axis center line.

Then, a texture 44 shown in FIG. 11D is mapped on the individual spray polygons 411 through 413, 421 through 423, and 431 through 433 by the rendering processor 263. Simultaneously, translucent processing is performed on overlapping polygons by the rendering processor (which also serves as a translucent processing unit) 263, and more specifically, the average value of the color of the texture 44 and the color of the wave-swell texture is used for the color of the overlapping portions between the spray polygons 411 through 413, 421 through 423, and 431 through 433 and the rolls 31 through 36.

As a consequence, the spray 14 of the waves is suitably displayed on the monitor 1, as shown in FIG. 11A.

A technique of displaying the wake 15 is now discussed with reference to FIGS. 2 through 9 and 12A through 12D. FIGS. 12A through 12D illustrate the wake 15: FIG. 12A illustrates the screen of the monitor 1 showing the wake 15; FIG. 12B is a side view illustrating polygons forming the wake 15, as viewed from the X-axis direction; FIG. 12C is a plan view illustrating the change of the configuration of the polygons over time, as viewed from the Y-axis direction; and FIG. 12D illustrates a texture 54 representing the wake 15.

Concerning polygons forming the wake 15 (hereinafter referred to as "wake polygons"), as shown in FIG. 9, J (J is an integer, and J is three in this embodiment) rectangular polygons 51, 52, and 53 are set with respect to the center line XC in the three-dimensional virtual space. The wake polygons 51 through 53 are set in such a manner that they are overlapped with each other and that upper reference sides 51a, 52a, and 53a are aligned with each other.

The wake polygons 51 through 53 are translated by the third polygon-coordinate processor 273. FIG. 12C illustrates a change of the configuration of the wake polygon 51 over time. The wake polygon 51 is processed, as illustrated in FIG. 12C, so that an opposing side 51b approaches the reference side 51a while the reference side 51a and the opposing side 51b are enlarged in the X-axis direction with respect to the center line XC. More specifically, the wake polygon 51 is processed so that the dimensions in the X-axis direction (i.e., the dimensions of the reference side 51a and the opposing side 51b) are enlarged in the order of D1, D2, and D3, and the dimension in the Z-axis direction (i.e., the dimension between the reference side 51a and the opposing side 51b) is reduced in the order of L1, L2, and L3. When the opposing side 51b reaches the reference side 51a, the polygon 51 is returned to the original state, i.e., the X-axis dimension is returned to D1 and the Z-axis dimension is returned to L1, and the above-described processing is repeated.

The wake polygons 52 and 53 are processed in a manner similar to the wake polygon 51 with a predetermined amount of time lag. Consequently, at one instant, the wake polygons 51, 52, and 53 are configured, as shown in FIG. 9.

The angle of the wake polygons 51, 52, and 53 with respect to the X-Z plane is equal to that of the roll 36. Accordingly, the wake 15 is displayed away from the swell of the waves 13, as shown in FIG. 2, thereby preventing the image from seeming unnatural.

Subsequently, the texture 54 shown in FIG. 12D is mapped on the wake polygons 51 through 53 by the rendering processor 263. Simultaneously, the rendering processor 263 (which also serves as an addition processor) executes addition processing, and more specifically, the rendering processor 263 adds the color of the texture 54 to the color of the overlapping portion of the wake polygons 51 through 53. Accordingly, the luminance of the overlapping portion is increased, thereby making the image displayed on the monitor 1 brighter. As a result, the wake 15 is suitably displayed on the monitor 1, as illustrated in FIG. 12A.

Figure 13:
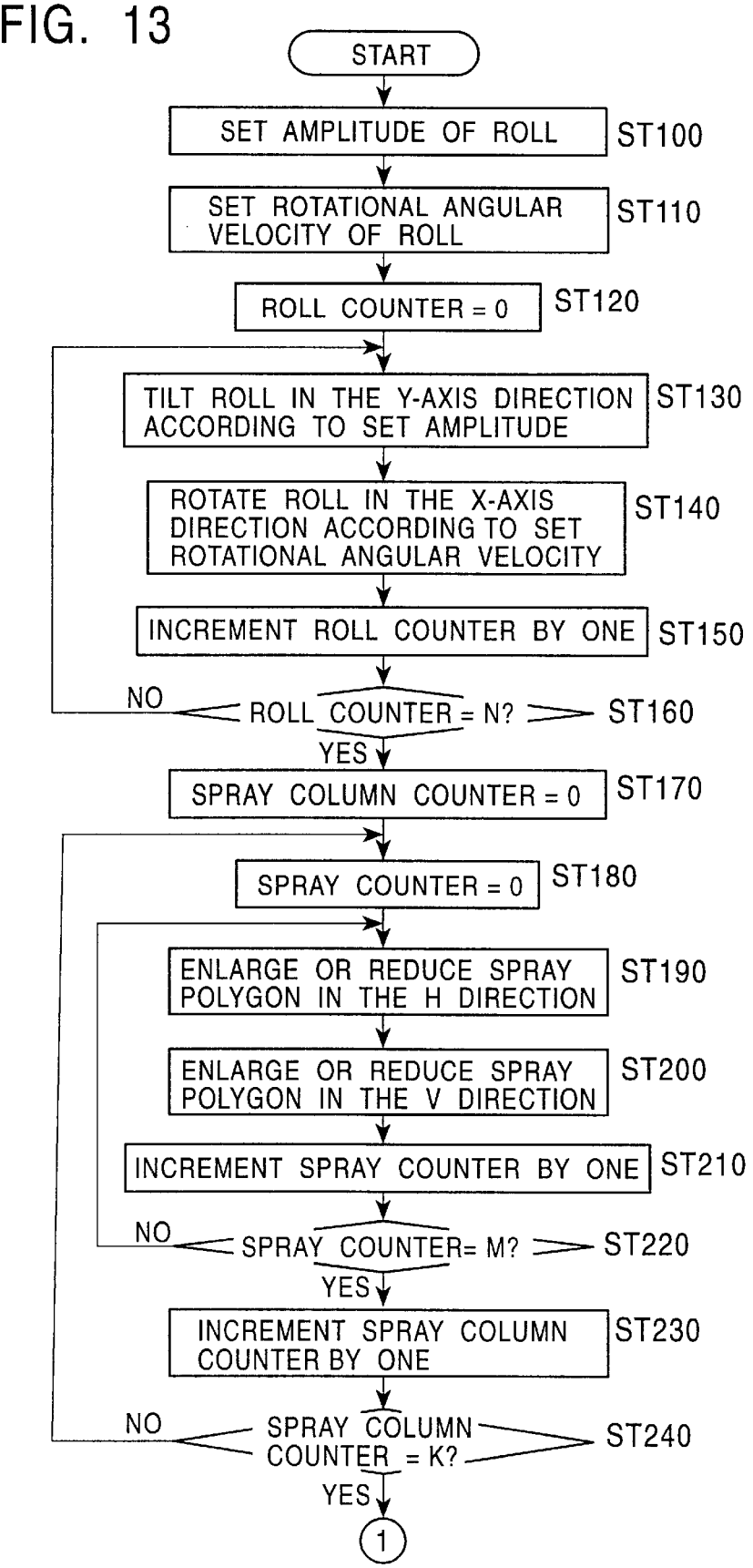
FIGS. 13 and 14 are a flow chart illustrating a process for creating images of the swell of waves, the spray of waves, and the wake.
Figure 14:
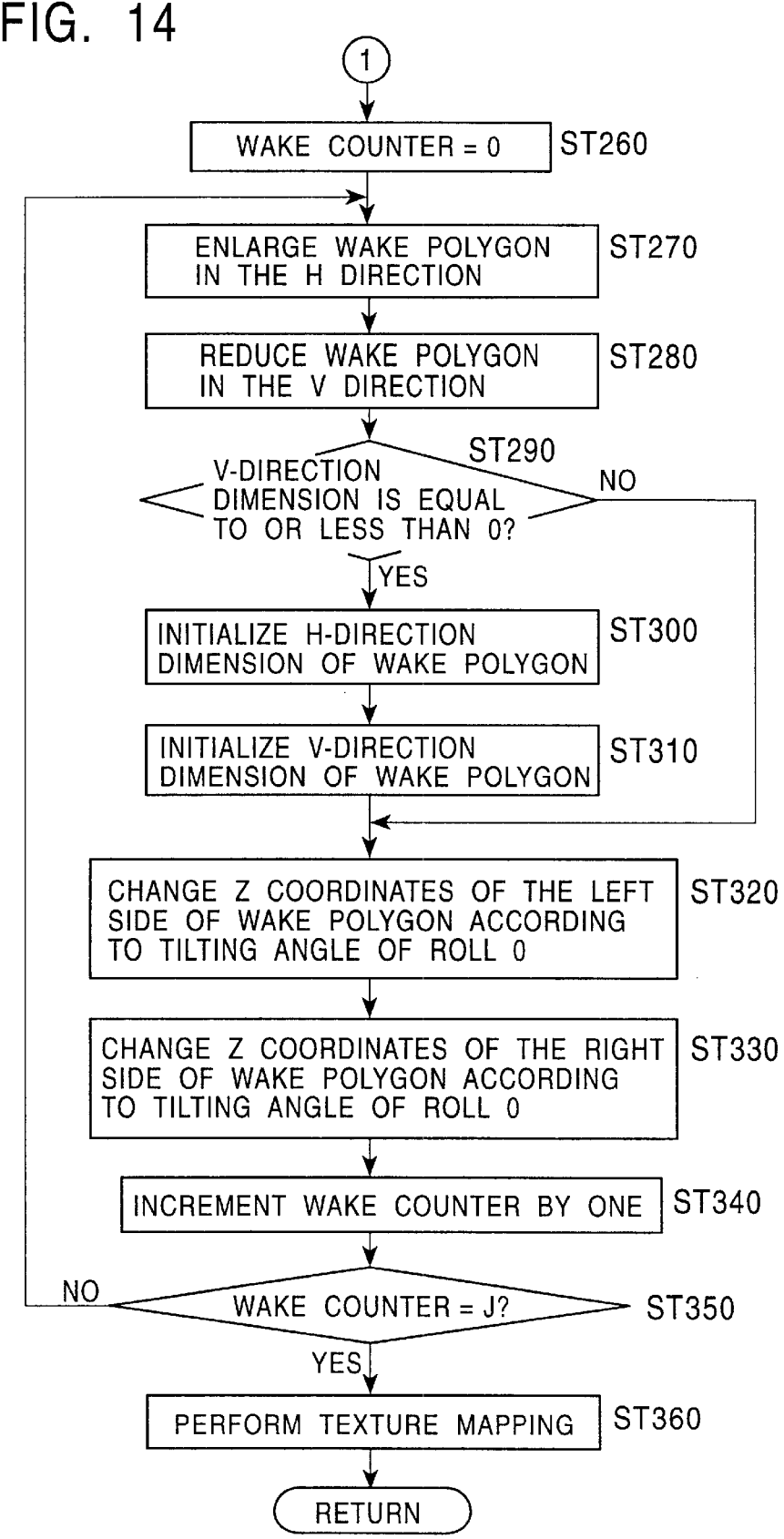

A description is now given of creating images of the swell of waves 13, the spray of waves 14, and the wake 15 with reference to the flow charts of FIGS. 13 and 14.

In step ST100, the amplitude of a roll, i.e., a predetermined tilting angle θ in the Y-axis direction, is first determined according to the set weather. Then, in step ST110, the rotational angular velocity ω of the roll is set according to the speed of the fishing boat 2.

Subsequently, in step ST120, a ROLL counter, which serves as a counter, is set to be zero. In step ST130, the roll is tilted in the Y-axis direction according to the determined amplitude θ, and in step ST140, the roll is rotated around the X axis according to the set rotational angular velocity ω.

Then, in step ST150, the ROLL counter is incremented by one, and it is determined in step ST160 whether the ROLL counter is equal to N (in this embodiment, N is six). If it is found in step ST160 that the ROLL counter is not equal to N, the process returns to step ST130. If it is found in step ST160 that the ROLL counter is equal to N, the process proceeds to step ST170. The ROLL values 0 through 5 correspond to the rolls 36 through 31, respectively, shown in FIG. 3.

In step ST170, a SPARY COLUMN counter, which serves as a counter, is set to zero, and in step ST180, a SPRAY counter, which also serves as a counter, is set to zero. Thereafter, in step ST190, a spray polygon is enlarged or reduced in the horizontal direction, and in step ST200, the spray polygon is enlarged or reduced in the vertical direction. Then, in step ST210, the SPRAY counter is incremented by one. It is determined in step ST220 whether the SPRAY counter is equal to M (in this embodiment, M is three). If it is found in step ST220 that the SPRAY counter is not equal to M, the process returns to step ST190. If the SPRAY counter is equal to M, the process proceeds to step ST230 in which the SPRAY COLUMN counter is incremented by one. It is then determined in step ST240 whether the SPRAY COLUMN counter is equal to K (in this embodiment, K is three). If it is determined in step ST240 that the SPRAY COLUMN counter is not K, the process returns to step ST180. If it is determined in step ST240 that the SPRAY COLUMN counter is equal to K, the process proceeds to step ST260.

The SPRAY values 0 through 2 of the SPRAY COLUMN counter 0 correspond to the first-column spray polygons 411 through 413, respectively, shown in FIG. 9. The SPRAY values 0 through 2 of the SPRAY COLUMN value 1 correspond to the second-column spray polygons 421 through 423, respectively, shown in FIG. 9, and the SPRAY values 0 through 2 of the SPRAY COLUMN value 2 correspond to the third-column spray polygons 431 through 433, respectively, shown in FIG. 9.

In step ST260, a WAKE counter, which serves as a counter, is set to zero. Then, in step ST270, a wake polygon is enlarged in the horizontal direction, and in step ST280, the wake polygon is reduced in the vertical direction. It is then determined in step ST290 whether the vertical dimension is equal to or less than zero. If the outcome of step ST290 is yes, in step ST300, the horizontal dimension of the wake polygon is set to be an initial value D1, and in step ST310, the vertical dimension of the wake polygon is set to be an initial value L1. The flow then proceeds to step ST320.

If it is found in step ST290 that the vertical dimension is greater than zero, the process proceeds to step ST320. In step ST320, the Z coordinates of the left side of the wake polygon are changed according to the tilting angle of the ROLL value 0. Then, in step ST330, the Z coordinates of the right side of the wake polygon are changed according to the tilting angle of the ROLL value 0.

Thereafter, in step ST340, the WAKE counter is incremented by one, and it is determined in step ST350 whether the WAKE counter is equal to J (in this embodiment, J is three). If it is found in step ST350 that the WAKE counter is not equal to J, the process returns to step ST270. If it is found in step ST350 that the WAKE counter is equal to J, the process proceeds to step ST360 in which texture is mapped on the corresponding polygon. The process is then completed.

In the foregoing embodiment, wave-spray models and wake models are formed by using polygons. The "polygons" used in this embodiment are not restricted to polygons, which are set in a three-dimensional coordinate system, and may be sprites, which are set in a two-dimensional coordinate system.

The present invention is not limited to the above-described embodiment, and the following modifications may be made.

(1) In the foregoing embodiment, hexagonal prisms are used for the configuration of the rolls 31 through 36. However, other configurations of prisms, such as pentagonal prisms or octagonal prisms, may be used.

(2) Although in the aforementioned embodiment the number of rolls 31 through 36 is six, it may be less than six or more than six. If n of an n-sided polygon is a large value, only a single roll may be employed.

(3) Although in the above-described embodiment the present invention is used in a fishing game, it may be applied to a water ski game. Additionally, the present invention may be used in, not only games, but also an image creating apparatus for virtually rendering a liquid object, such as a sea or a river.

(4) The ROM 24, which serves as a recording medium, may be a portable recording medium, such as a CD-ROM, an optical disc, a memory card, or a floppy disk, thereby facilitating exchanging or updating of game programs.

What is claimed is:

1. An image creating apparatus for rendering a liquid object model which virtually represents a liquid object set in a three-dimensional virtual space, said image creating apparatus comprising:

display means;

first polygon storage means for storing at least one polygonal-prism liquid-object polygon set which consists of a plurality of polygons and which forms the liquid-object model, a lateral surface of the polygon set being arranged in a direction intersecting a line from a predetermined viewpoint;

first texture storage means for storing a liquid-object texture to be mapped on the polygons of the liquid-object polygon set;

first polygon-coordinate processing means for tilting a longitudinal dimension of the liquid-object polygon set in a predetermined direction with a predetermined amplitude with respect to a set position such that the liquid-object polygon set before said tilting and after said tilting is sequentially displayed; and rendering processing means for displaying the liquid object model on said display means by mapping the liquid object texture on the polygons of the liquid-object polygon set.

2. An image creating apparatus according to claim 1, wherein said first polygon storage means stores a plurality of the liquid-object polygon sets which are sequentially arranged along the line from the viewpoint.

3. An image creating apparatus according to claim 1, wherein said first polygon-coordinate processing means rotates the liquid-object polygon set around an axis intersecting the line from the viewpoint with respect to the set position.

4. An image creating apparatus according to claim 2, wherein said first polygon-coordinate processing means rotates the liquid-object polygon set around an axis intersecting the line from the viewpoint with respect to the set position.

5. An image creating apparatus according to claim 1, further comprising:

second polygon storage means for storing at least a spray polygon which forms a spray model virtually representing spray of the liquid object;

second texture storage means for storing a spray texture representing the spray model; and second polygon-coordinate processing means for enlarging and reducing dimensions of the spray polygon over time within a predetermined range, wherein said rendering processing means displays the spray model on said display means by mapping the spray texture on the spray polygon.

6. An image creating apparatus according to claim 2, further comprising:

second polygon storage means for storing at least a spray polygon which forms a spray model virtually representing spray of the liquid object;

second texture storage means for storing a spray texture representing the spray model; and second polygon-coordinate processing means for enlarging and reducing dimensions of the spray polygon over time within a predetermined range, wherein said rendering processing means displays the spray model on said display means by mapping the spray texture on the spray polygon.

7. An image creating apparatus according to claim 3, further comprising:

second polygon storage means for storing at least a spray polygon which forms a spray model virtually representing spray of the liquid object;

second texture storage means for storing a spray texture representing the spray model; and second polygon-coordinate processing means for enlarging and reducing dimensions of the spray polygon over time within a predetermined range, wherein said rendering processing means displays the spray model on said display means by mapping the spray texture on the spray polygon.

8. An image creating apparatus according to claim 4, further comprising:

second polygon storage means for storing at least a spray polygon which forms a spray model virtually representing spray of the liquid object;

second texture storage means for storing a spray texture representing the spray model; and second polygon-coordinate processing means for enlarging and reducing dimensions of the spray polygon over time within a predetermined range, wherein said rendering processing means displays the spray model on said display means by mapping the spray texture on the spray polygon.

9. An image creating apparatus for rendering a liquid object model which virtually represents a liquid object set in a three-dimensional virtual space, said image creating apparatus comprising:

display means;

first polygon storage means for storing at least one polygonal-prism liquid-object polygon set which consists of a plurality of polygons and which forms the liquid-object model, a lateral surface of the polygon set being arranged in a direction intersecting a line from a predetermined viewpoint;

first texture storage means for storing a liquid-object texture to be mapped or the polygons of the liquid-object polygon set;

first polygon-coordinate processing means for tilting a longitudinal dimension of the liquid-object polygon set in a predetermined direction with a predetermined amplitude with respect to a set position;

rendering processing means for displaying the liquid object model on said display means by mapping the liquid object texture on the polygons of the liquid-object polygon set;

third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

10. An image creating apparatus according to claim 2, further comprising:

a third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

11. An image creating apparatus according to claim 3, further comprising:

a third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

12. An image creating apparatus according to claim 4, further comprising:

a third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

13. An image creating apparatus according to claim 5, further comprising:

a third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

14. An image creating apparatus according to claim 6, further comprising:

a third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

15. An image creating apparatus according to claim 7, further comprising:

a third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

16. An image creating apparatus according to claim 8, further comprising:

a third polygon storage means for storing at least one quadrilateral wake polygon which forms a wake model virtually representing wake of the liquid object and which has a pair of first sides intersecting the line from the viewpoint and a pair of second sides orthogonal to the first sides;

third texture storage means for storing a wake texture representing the wake model; and third polygon-coordinate processing means for enlarging dimensions of the first sides and also reducing dimensions of the second sides with a lapse of time while fixing positions of the second sides, wherein said rendering processing means displays the wake model on said display means by mapping the wake texture on the wake polygon.

17. An image creating apparatus according to claim 1, wherein the liquid-object model virtually represents a sea wave.

18. An image creating apparatus according to claim 2, wherein the liquid-object model virtually represents a sea wave.

19. An image creating apparatus according to claim 3, wherein the liquid-object model virtually represents a sea wave.

20. An image creating apparatus according to claim 4, wherein the liquid-object model virtually represents a sea wave.

21. An image creating apparatus according to claim 5, wherein the liquid-object model virtually represents a sea wave.

22. An image creating apparatus according to claim 6, wherein the liquid-object model virtually represents a sea wave.

23. An image creating apparatus according to claim 7, wherein the liquid-object model virtually represents a sea wave.

24. An image creating apparatus according to claim 8, wherein the liquid-object model virtually represents a sea wave.

25. An image creating apparatus according to claim 9, wherein the liquid-object model virtually represents a sea wave.

26. An image creating apparatus according to claim 10, wherein the liquid-object model virtually represents a sea wave.

27. An image creating apparatus according to claim 11, wherein the liquid-object model virtually represents a sea wave.

28. An image creating apparatus according to claim 12, wherein the liquid-object model virtually represents a sea wave.

29. An image creating apparatus according to claim 13, wherein the liquid-object model virtually represents a sea wave.

30. An image creating apparatus according to claim 14, wherein the liquid-object model virtually represents a sea wave.

31. An image creating apparatus according to claim 15, wherein the liquid-object model virtually represents a sea wave.

32. An image creating apparatus according to claim 16, wherein the liquid-object model virtually represents a sea wave.

33. An image creating method for rendering a liquid-object model which virtually represents a liquid object set in a three-dimensional virtual space, said image creating method comprising the steps of:

storing at least one polygonal-prism liquid-object polygon set which consists of a plurality of polygons and which forms the liquid-object model, a lateral surface of the polygon set being arranged in a direction intersecting a line from a predetermined viewpoint;

storing a liquid-object texture to be mapped on the polygons of the liquid-object polygon set;

tilting a longitudinal dimension of the liquid-object polygon set in a predetermined direction with a predetermined amplitude with respect to a set position;

sequentially displaying the liquid-object polygon set before said tilting and after said tilting; and displaying the liquid-object model on display means by mapping the liquid-object texture on the polygons of the liquid-object polygon set.

34. A recording medium for recording an image creating program used for rendering a liquid-object model virtually representing a liquid object set in a three-dimensional virtual space, said image creating program comprising executable code for execution by a computer processor causing said computer processor to perform the steps of:

providing at least one polygonal-prism liquid-object polygon set which consists of a plurality of polygons and which forms the liquid-object model, a lateral surface of the polygon set being arranged in a direction intersecting a line from a predetermined viewpoint;

providing a liquid texture to be mapped on the polygons of the liquid-object polygon set;

tilting a longitudinal dimension of the liquid-object polygon set in a predetermined direction with a predetermined amplitude with respect to a set position;

sequentially displaying the liquid-object polygon set before said tilting and after said tilting; and mapping the liquid texture on the polygons of the liquid-object polygon set.

35. A video game machine comprising:

image creating means for rendering a liquid-object model which virtually represents a liquid object set in a three-dimensional virtual space, said image creating means comprising:

display means;

first polygon storage means for storing at least one polygonal-prism liquid-object polygon set, which consists of a plurality of polygons and which forms the liquid-object model, a lateral surface of the polygon set being arranged in a direction intersecting a line from a predetermined viewpoint;

first texture storage means for storing a liquid-object texture to be mapped on the polygons of the liquid-object polygon set;

first polygon-coordinate processing means for tilting a longitudinal dimension of the liquid-object polygon set in a predetermined direction with a predetermined amplitude with respect to a set position such that the liquid-object polygon set before said tilting and after said tilting is sequentially displayed;

rendering processing means for displaying the liquid-object model on said display means by mapping the liquid-object texture on the polygons of the liquid-object polygon set;

externally operable operation means for outputting an operation signal according to an operation state; and viewpoint-line changing means for changing a viewpoint-line direction according to the operation signal.

* * * * *